United States Patent
Barson

(10) Patent No.: US 9,225,249 B2
(45) Date of Patent: Dec. 29, 2015

(54) POWER MANAGEMENT ALARM DEVICES

(71) Applicant: Honeywell International Inc., Morristown, NJ (US)

(72) Inventor: Michael Barson, Nuneaton (GB)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 103 days.

(21) Appl. No.: 14/166,485

(22) Filed: Jan. 28, 2014

(65) Prior Publication Data

US 2015/0214842 A1    Jul. 30, 2015

(51) Int. Cl.
| | |
|---|---|
| *G08B 17/10* | (2006.01) |
| *G08B 21/18* | (2006.01) |
| *H02M 3/158* | (2006.01) |
| *G08B 17/00* | (2006.01) |

(52) U.S. Cl.
CPC ............ *H02M 3/1582* (2013.01); *G08B 17/00* (2013.01); *G08B 21/18* (2013.01)

(58) Field of Classification Search
CPC .......... G08B 5/36; G08B 17/10; G08B 21/18; H02M 3/1582
USPC ........................... 340/505, 506, 517, 538, 3.5
See application file for complete search history.

(56) References Cited

U.S. PATENT DOCUMENTS

| | | | |
|---|---|---|---|
| 6,242,896 B1 | 6/2001 | Nieberger | |
| 6,700,352 B1 * | 3/2004 | Elliott et al. | ................... 320/130 |
| 2008/0158920 A1 * | 7/2008 | Hastings et al. | ................. 363/60 |
| 2009/0167260 A1 | 7/2009 | Pauritsch et al. | |
| 2010/0302045 A1 * | 12/2010 | Foster | ........................... 340/577 |
| 2011/0187415 A1 * | 8/2011 | Kurimoto | ....................... 327/103 |
| 2013/0193865 A1 | 8/2013 | Keller et al. | |
| 2014/0043034 A1 * | 2/2014 | Hemon et al. | ................. 324/503 |
| 2014/0368128 A1 * | 12/2014 | Elferich et al. | ............... 315/297 |

FOREIGN PATENT DOCUMENTS

| | | |
|---|---|---|
| CN | 201984471 U | 9/2011 |
| CN | 202196396 U | 4/2012 |
| CN | 202383806 U | 8/2012 |
| EP | 1622106 A1 | 2/2006 |
| FR | 2 934 703 A1 | 2/2010 |

OTHER PUBLICATIONS extended European search report from corresponding EP patent application 15152166.3, dated Jun. 26, 2015.
Wikipedia, Buck Converter, Retrieved from the Internet: URL: https://en.wikipedia.org/wiki/Buck_converter, retrieved on Jun. 12, 2015.

* cited by examiner

*Primary Examiner* — Daniel Wu
(74) *Attorney, Agent, or Firm* — Husch Blackwell LLP

(57) ABSTRACT

A system including an alarm device, the alarm device further includes a switch mode buck converter, a capacitor that is charged by the buck converter, a boost converter that powers an output device primarily from energy drawn from the capacitor and circuitry coupled to the buck converter and boost converter, wherein the buck converter charges the capacitor with a relatively constant current and wherein the circuitry dynamically adjusts an instantaneous duty cycle of the buck converter to achieve the constant current based upon a power setting of the output device.

20 Claims, 3 Drawing Sheets

POWER MANAGEMENT ALARM DEVICES

FIELD

The application pertains to protection systems and more particularly to wired alarm systems.

BACKGROUND

Protection systems are known to protect secured areas. For example, one known protection system is a fire/security system. Such systems typically rely upon a number of sensors within the secured area that detect some known hazard.

For example, a fire alarm system may include a number of fire sensors (and audio and visual fire warning devices) distributed throughout the secured area or concentrated in the areas of greatest risk. One known fire alarm system, called an analogue addressable fire system, includes one or more 2-wire loops that connect each of the sensors to a central alarm panel.

Analogue addressable fire systems combine power transmission and data communication on a pair of conductors, called a 2-wire loop, between the central panel (i.e., a control and indicating equipment (CIE) panel) and a number of outstations or field devices (e.g., audible alarms, flashers, etc.), which can often exceed 100 devices. In large or even medium sized installations, the length of each loop may exceed 1 kilometer (Km). In some cases, the CIE may be in control of a number of such loops with each loop exceeding 1 Km.

In order to improve reliability, each 2-wire loop may be driven from both ends. In order to further improve reliability, each device connected to the loop may have an in-built short circuit isolator that opens the loop adjacent the device in order to isolate the short circuit.

Included within each short circuit isolator are two voltage detectors, a control element and an isolation device, which may be a relay or MOSFET switch. If a short-circuit occurs, it will pull down the loop voltage below a threshold level. This will cause the isolator to open-circuit one conductor of the 2-wire loop. It should be noted that the isolator and the associated connection to the loop cable could have a combined series resistance of up to 0.1 ohms.

Due to the combined series resistances of the devices on the loop, the loop cable resistance and the current drawn by each of the devices connected to the loop, there is typically a large drop in loop voltage during alarm conditions. This problem can be aggravated where a short circuit or open circuit occurs adjacent to the CIE panel and where the loop can only be driven by one end of the cable.

However, it is often difficult to anticipate difficulties associated with device reliability in this situation. Accordingly, a need exists for better methods of powering devices on 2-wire loops.

DETAILED DESCRIPTION

Figure 1:
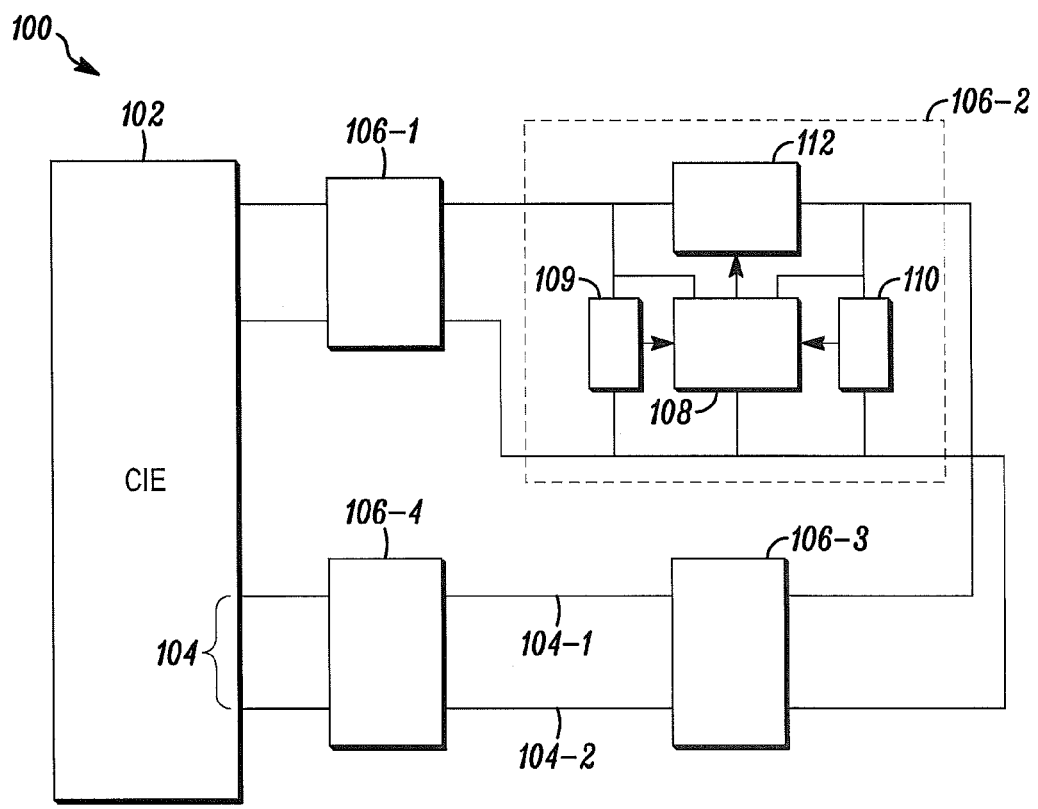
FIG. 1 illustrates a block diagram of an analogue addressable alarm system in accordance with an illustrated embodiment.

While disclosed embodiments can take many different forms, specific embodiments thereof are shown in the drawings and will be described herein in detail with the understanding that the present disclosure is to be considered as an exemplification of the principles thereof as well as the best mode of practicing same, and is not intended to limit the application or claims to the specific embodiment illustrated.

FIG. 1 is a block diagram of an analogue addressable alarm system 100 shown generally in accordance with an illustrated embodiment. Included within the alarm system is a CIE panel 102 and a number of alarm devices 106 connected to the panel via one or more 2-wire loops 104.

The 2-wire loops each include a first conductor 104-1 and a second conductor 104-2. Opposing ends of each of the conductors are connected to the panel.

The alarm devices 106-1, 106-2, 106-3 and 106-4 are each connected across the first and second conductors. In this regard, the alarm devices may include one or more of fire detection devices, visual annunciators and audible annunciators.

Within each of the devices (e.g., 106-2) are two voltage detectors 109 and 110, an isolator relay or MOSFET switch 112 and control circuits 108. At least a portion of the control circuits, the two voltage detectors and the relay or MOSFET form a short-circuit isolator.

Figure 2:
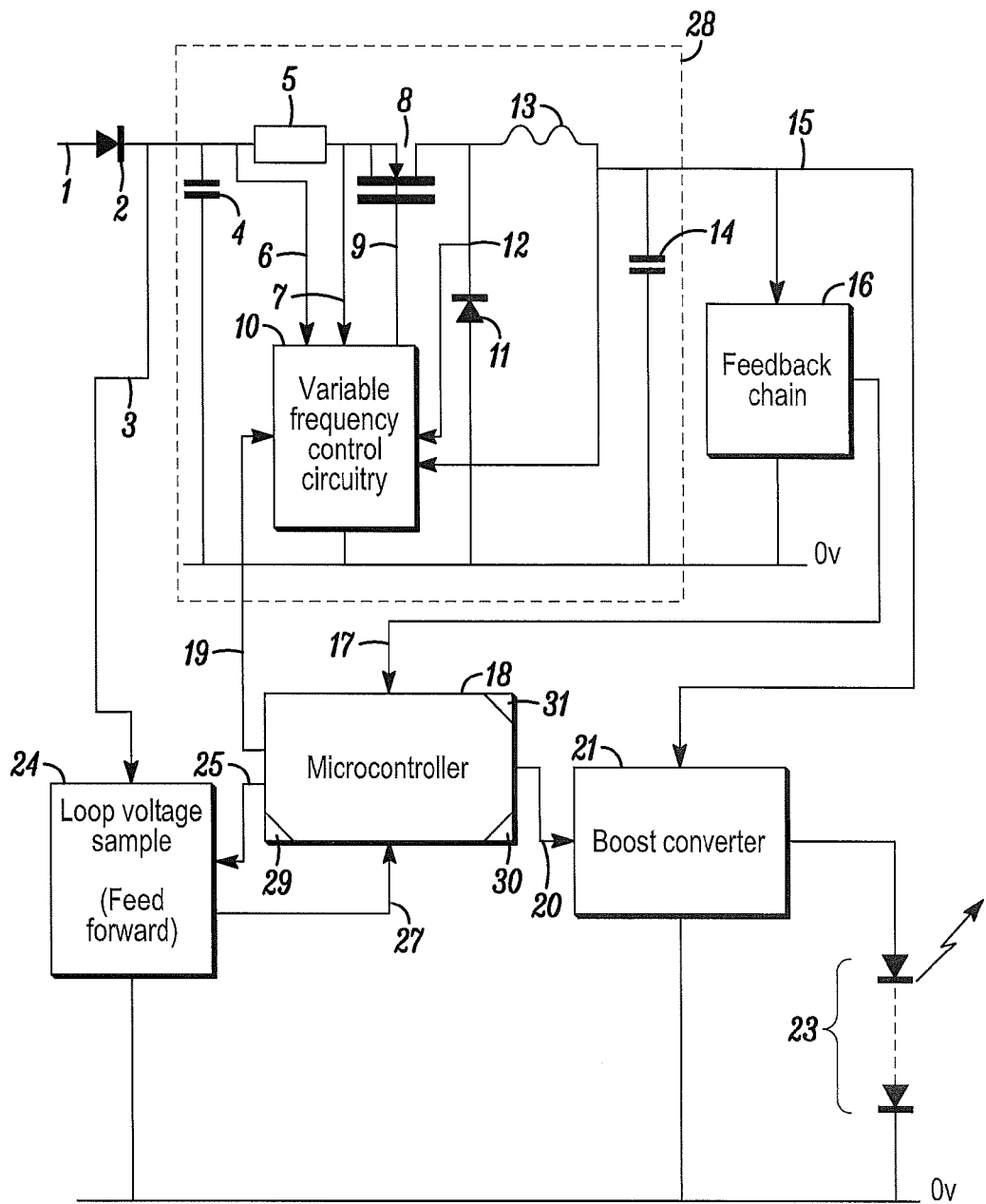
FIG. 2 is a circuit diagram of a device that may be used by the alarm system of FIG. 1.

At least another portion of the control circuits form an output device (e.g., a strobe light, an audible alarm, etc.) that is used to alert occupants of the secured area of the possibility of a fire. FIG. 2 depicts an example of an output device (e.g., a strobe alarm) in accordance with an illustrated embodiment.

In general, the control techniques described herein could be used with the audio-visual alarm devices of the analogue addressable fire alarm loop of FIG. 1, or with conventional fire alarm systems. As the benefits are generally more significant for high powered loop based strobe lights, the following description will focus primarily on that particular application.

The portion of the control circuits 108 shown in FIG. 1 that drive a visual or audible alarm may be based upon any of a number of different types of discrete components. For example, the control circuits of FIG. 2 may rely upon a buck converter 28, a microcontroller 18 and a boost converter 21.

In this regard, power and instructions may be received on an input connection 1 and through a diode 2. The voltage and instructions may be sampled and read via a loop voltage sampling device 24 and provided as input to the microprocessor.

An output device 23 may be driven via the boost converter. As depicted in FIG. 2, the output device may be a strobe light including a number of series connected light emitting diodes (LEDs).

The microcontroller includes one or more processor apparatus (processors) 29 each operating under control of one or more computer programs 30 loaded from a non-transitory computer readable medium (memory) 31. As used herein, reference to a step performed by a computer program is also reference to the processor that executed that step.

The strobe light 23 of FIG. 2 uses a microcontroller voltage feedback loop to control power output from the buck converter using pulse width modulation (PWM). The buck converter uses current control mode so that variations in the start-up and operating currents are controlled and substantially eliminated by the microcontroller. Overall this allows the strobe to quickly and efficiently stabilize its output illumination and maintain a constant level of illumination on the average even if the loop input voltage varies between a maximum and a minimum voltage that can otherwise be expected on a fault free loop.

The buck converter operates by providing a variable PWM pulse output that charges-up and regulates the voltage on a large reservoir capacitor 14 used for energy storage, so that high peak current pulses can be delivered to a LED chain via a boost converter, during a strobe flash period controlled by the microcontroller.

The boost converter (via a control input from the microcontroller) limits its peak primary current on a cycle by cycle basis, with its output voltage normally limited by the forward voltage of the LED chain. During the strobe flash period, large high frequency pulse currents are taken from the reservoir capacitor, which causes its voltage to drop initially and during the strobe flash period. The feedback loop controlled by the microcontroller samples the voltage on the reservoir capacitor many times over a complete strobe flash and recharge cycle.

The microcontroller uses a voltage slope error control program (i.e., technique) that allows the microcontroller to adjust the current from the buck converter after each sample period if the charge slope rate on the capacitor is not calculated to reach the correct regulation voltage by the time the next strobe flash period starts and to compensate the output current for the change in voltage level on the reservoir capacitor. This feedback control ensures that the input current is very highly filtered over the whole strobe cycle, with almost no losses and ensures that it is constant and non-pulsating, giving the lowest voltage drops possible on the external loop wiring.

If a different output power setting is required by a user from the strobe, then a processor of the microcontroller adjusts both the period of the strobe flash and the corresponding PWM duty cycle level controlling the current from the buck converter. The microcontroller is then free to make finer slope rate adjustments to the new PWM duty cycle in response to the sampled voltage feedback level on the reservoir capacitor.

It is important that the strobe remains operational, without drawing an excessive current if the loop voltage starts to fall markedly, for example because of a wiring fault or if the system is overloaded. The loop voltage level is also sampled by the microcontroller to provide an additional, level dependent voltage feed-forward control using a feed-forward control program. The microcontroller is then able to control the maximum power used by the strobe and hence along with all other strobes, control the maximum loop current and therefore the minimum voltage present on the loop wiring.

This control is possible because if the loop voltage falls below a minimum value, the microcontroller will apply a reduction in the buck converters control PWM duty cycle and strobe flash period, in-line with the reduction in loop voltage below a critical level. The input current to the strobe while normally increasing due to the current mode control as the loop voltage falls, now starts to reduce, until a new operating point is reached for each of the strobes on any position on the loop.

In this condition, all the strobe devices can use the maximum possible power that is available for the loop to supply at any position, without causing a communications corruption to any device. Additionally the microcontroller may also control an associated sounder current via a feedforward processor, by reducing the sound pressure level (SPL) in response to the feedforward level.

In FIG. 2, the loop input voltage 1 is peak rectified by diode 2 to form a rectified voltage on connection 3 on a relatively small input reservoir capacitor 4 that maintains a supply voltage during loop communications and also supplies high frequency current to a variable frequency switch-mode buck converter 28. This buck converter 28 is designed to run at a frequency well above 20 KHz and uses current-mode control to provide an efficient current source to convert the rectified voltage 3 to a pulse supply 15 on a large reservoir capacitor 14.

The reservoir capacitor 14 may also have additional high frequency de-coupling capacitors and ideally will be a low impedance super-capacitor of at least 5V. Under non-alarm conditions the reservoir capacitor 14 may also be regulated at a voltage significantly below its maximum rated voltage to increase the capacitor's useful operational life.

The microcontroller 18 (via the buck converter 28) controls the charge rate on reservoir capacitor 14 by using a voltage feedback control loop. This feedback loop allows a largely uncorrected discharge and controlled charge ramp voltage to exist on the pulse supply 15, when the strobe is in alarm. The pulse supply voltage 15 is fed into a feedback chain 16 which is then sampled by an analogue to digital converter (ADC) port 17 of microcontroller 18. Microcontroller 18 produces a control PWM output signal 19 at a frequency of less than $\frac{1}{10}$ of that of the buck converter 28. The duty cycle of the PWM output 19 varies in response to the sampled voltage on ADC port 17. The buck converter 28 can also directly regulate the voltage on the pulse supply 15 at a slightly higher value if the voltage slope on reservoir capacitor 14 overshoots the intended regulation point as controlled by the microcontroller 18.

The microcontroller 18 uses a voltage slope error control technique and allows the PWM to adjust the average current of the buck converters after each sample period if the charge slope rate on the capacitor is not calculated to reach the correct regulation voltage by the time the next strobe flash period starts and to otherwise compensate the output current of the buck converter for the change in voltage level on the reservoir capacitor. This voltage feedback control is clearly different than a conventional analogue voltage feedback loop, where a large error in the output causes a large change in the PWM duty cycle and correspondingly a large correction current occurs until the error reduces.

Buck converter 28 uses a variable frequency control circuit 10 to produce a boundary current control mode. This means that the current in inductor 13 is just on the boundary of being continuous and therefore the average output charge current supplied to the reservoir capacitor 14 is then a simple linear term of:

$$I\text{output} = \tfrac{1}{2} \times I\text{peak} \times PWM \text{ duty cycle}.$$

The peak ramp current in inductor 13 is controlled by monitoring the differential voltage 6, 7 across a sense resistor 5 and terminating the on-time of a suitable switching transistor 8 via control line 9. The current in inductor 13 will now ramp down as diode 11 conducts. The diode voltage 12 is sensed to ensure that the currents ramps to zero before the next switching cycle can start. If a reduction occurs in the input loop voltage 1 then the current in inductor 13 will ramp-up at a proportionally slower rate and hence cause an increase in the on-time (Ton) of transistor 8 given by:

$$T\text{on} = (I\text{peak} \times L)/(V\text{input} - V\text{output}).$$

As the off-time (Toff) depends only on the output voltage, then the average input current therefore automatically increases with a fall in input voltage as the on-time increases as follows:

$$I\text{input} = PWM \text{ duty cycle} \times \tfrac{1}{2} \times I\text{peak} \times 1/(1+T\text{off}/T\text{on}).$$

The pulse supply 15 powers a highly efficient boost converter 21 which is activated by microcontroller 18 when the strobe is in alarm and a flash pulse is required. The peak primary current is controlled on a cycle by cycle basis and will be at a relatively high frequency, typically well over 100 kHz. Reservoir capacitor 14 supplies the high frequency pulse currents required by the boost converter 21 which then sources current in to a series connected LED chain 23. The LED chain 23 clamps the output voltage of the boost converter 21 to the forward voltage drop of the particular LEDs used. LED chain 23 may be comprised of a number of discrete LEDs or a single package containing many dies. The LED colour will normally be white or red with the total forward voltage higher than the maximum voltage on the reservoir capacitor 14. If an open circuit fault occurs in the LED chain 23 then the boost converter 21 will enter an overvoltage protection mode.

When the strobe is first powered-up, the reservoir capacitor 14 will charge-up to about 75% of its maximum value with the average input current and output voltage limited by the duty cycle of the PWM output 19 under the control of the microcontroller 18 so that no power-up surge current occurs. For each power setting of the strobe to adjust the illumination coverage, the PWM output 19 and boost converter 21 will correspondingly have a different duty cycle, so that the power-up current will be no higher than the operating alarm current of a particular setting.

After all the loop devices are powered-up and when the strobe enters the alarm condition, the boost converter is switched-on, to supply a flash pulse current in to the LED chain 23. Initially the voltage on the pulse supply 15 will only be at typically 75% of its maximum value, so the microcontroller starts to charge up the pulse supply 15 while soft-starting the boost pulse width 20 causing the flash pulse width supplied to the LED chain 23 to increase. The flash pulse width will keep increasing until the maximum level is reached for a particular power setting just after the pulse supply 15 reaches its alarm operating level. This process occurs so that the loop input current does not increase above the normal operation alarm level as the strobe enters the alarm condition.

In alarm, the microcontroller 18 will pulse the LED chain 23 up to a maximum of about 80 ms at a rate as low as 0.5 Hz. If the power setting of the strobe needs to be decreased for example to ½ of its maximum, then the pulse width applied to the LED chain 23 together with the PWM duty cycle applied to the buck converter will be decreased to ½ of the maximum value, so that the strobe only uses ½ the average input current. However the effective intensity of the strobe will not fall by quite the same amount due to the increased effectiveness of smaller flash pulse widths.

The overall effect of this process is to always provide a well-controlled, highly filtered and non-pulsating input current from the loop during power-up and throughout the alarm operation at any desired power setting. This minimizes the voltage drop on the loop wiring for a given power setting, maximizes the integrity of the loop communications and allows different numbers of strobes to be used on the loop as controlled by the appropriate power setting.

If a fault occurs on the loop, buck converter 28 is designed to provide a simple hardware duty cycle limit for voltages below the lowest normal loop voltage, so as to provide an instantaneous limit on the input current demanded beyond a maximum value. The rectified loop voltage 3 is also regularly sampled by microcontroller 18 using port 25 to activate sampling circuit 24. The output of the sampling circuit 24 is a scaled down and filtered version of the rectified loop voltage 3 and is measured by an ADC input 27 of microcontroller 18.

Microcontroller 18 is then able to reduce the maximum power used by the strobe by reducing the PWM level controlling the buck converter 28 and boost pulse width 20 applied to the boost converter 21 in-line with the reduction in loop voltage below a control level. As the load on the buck converter 28 reduces at the same time as the PWM duty cycle reduces, then the voltage on the pulse supply 15 remains principally unchanged.

The overall action of the strobe to a lower than normal loop voltage during alarm, is to reduce its current consumption as the loop voltage falls, until a new operating point is reached for each of the strobes on any position on the loop. To reduce the possibility of the loop becoming unstable, the reduction in strobe current acts relatively fast for a falling loop voltage, however an increase in loop current occurs relatively slowly for a rising loop voltage, when below a control level.

Figure 3:
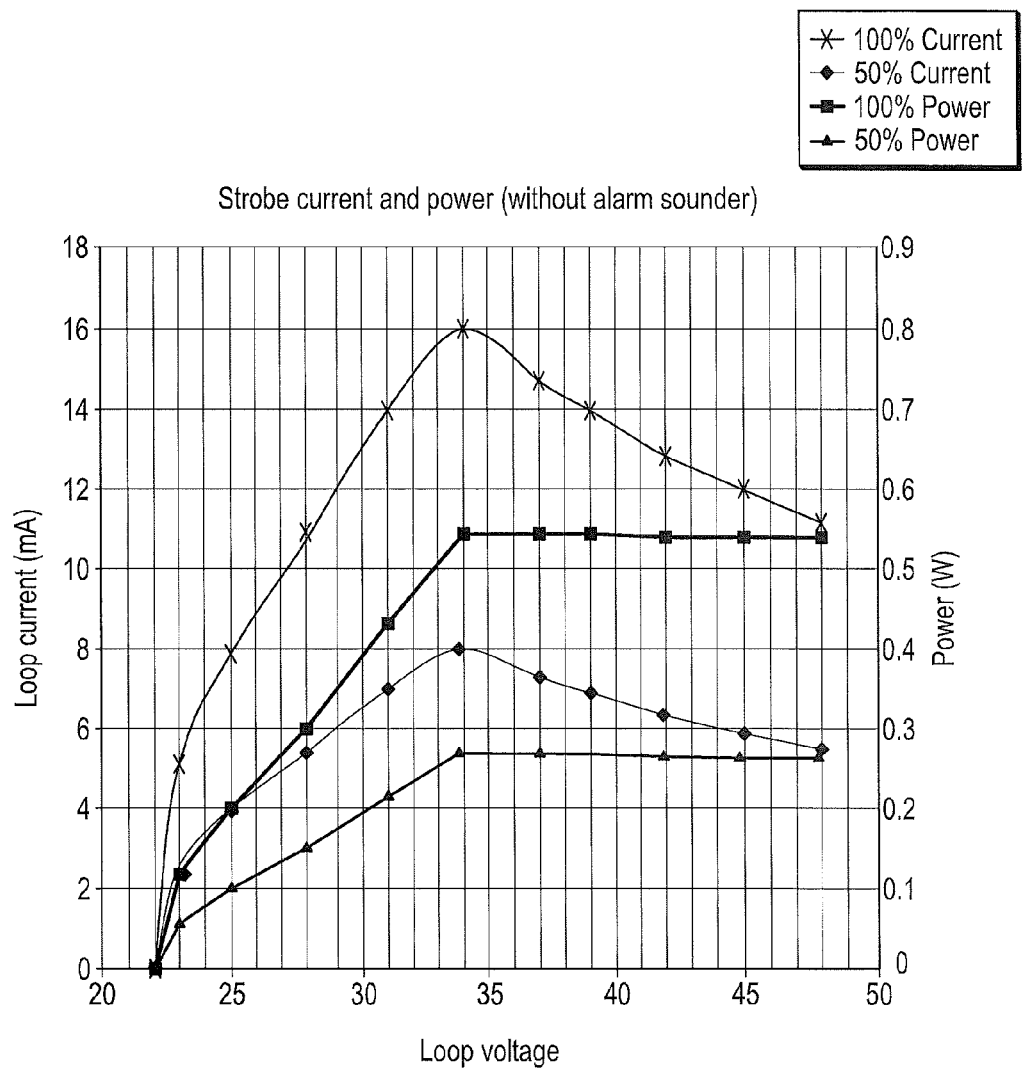
FIG. 3 depicts loop current versus loop voltage in the device of FIG. 1.

In FIG. 3, the plot shows how the feed-forward control reduces the current used by the strobe as the loop voltage falls below a control level. This could be a step-wise or more linear reduction. In this example, above 34V the strobes act as a negative impedance load, using a constant power and giving a stable illumination for normal loop voltages. Below 34V the strobe current and power are shown reducing with the loop voltage. The slope rate at which the reduction in current and power occur may also increase if the loop voltage continues to fall, and in the example shown a more rapid decrease occurs below 23V. The current and power of an alarm sounder may also follow curves with similar characteristics to that of the strobe using similar feed-forward techniques to control the volume of its SPL. It should be noted that as the loop voltage heavily depends on the total loop current, it should be clear that all the alarm devices are free to act collectively as an entire control system.

By having this level of control, the number of devices used on the loop can be increased, because a very large allowance does not have to be factored in for operation after a wiring fault occurs on the loop wiring. Additionally the loop will become more robust and less sensitive to unexpected increases in cable length, total loading or distribution of loading which could occur in practice and which differs from what was planned.

In general, the system includes an alarm device, the alarm device further includes a switch mode buck converter, a capacitor that is charged by the buck converter, a boost converter that powers an output device primarily from energy drawn from the capacitor and circuitry coupled to the buck converter and boost converter, wherein the buck converter charges the capacitor with a relatively constant current and wherein the circuitry dynamically adjusts an instantaneous duty cycle of the buck converter to achieve the constant current based upon a power setting of the output device.

Under another embodiment, the system includes an analogue addressable alarm system; a panel of the analogue addressable alarm system, a 2-wire loop with opposing ends of each wire of the 2-wire loop connected to the panel and an alarm device coupled across the 2 wires of the 2-wire loop, the alarm device further includes a switch mode buck converter, a capacitor that is charged by the buck converter, a boost converter that powers an output device primarily from energy drawn from the capacitor; and circuitry coupled to the buck converter and boost converter, wherein the buck converter charges the capacitor with a relatively constant current and wherein the circuitry dynamically adjusts an instantaneous duty cycle of the buck converter to provide the constant current based upon a power setting of the output device.

In still another embodiment, the system includes an analogue addressable alarm system, a panel of the analogue addressable alarm system, a 2-wire loop with opposing ends of each wire of the 2-wire loop connected to the panel and a plurality of alarm devices coupled across the 2 wires of the 2-wire loop, the alarm devices each further include a switch mode buck converter, a capacitor that is charged by the buck converter, a boost converter that powers an output strobe light primarily from energy drawn from the capacitor and circuitry coupled to the buck converter and boost converter, wherein the buck converter charges the capacitor with a relatively constant current and wherein the circuitry dynamically adjusts an instantaneous duty cycle of the buck converter to provide the constant current based upon a power setting of the strobe light.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims.

Further, logic flows depicted in the figures do not require the particular order shown, or sequential order, to achieve desirable results. Other steps may be provided, or steps may be eliminated, from the described flows, and other components may be add to, or removed from the described embodiments.

The invention claimed is:

1. A system comprising:
an alarm device, the alarm device further comprising:
a switch mode buck converter;
a capacitor that is charged by the buck converter;
a boost converter that powers an output device primarily from energy drawn from the capacitor; and
circuitry coupled to the buck converter and boost converter,
wherein the buck converter charges the capacitor with a relatively constant current and wherein the circuitry dynamically adjusts an instantaneous PWM control duty cycle of the buck converter to achieve the constant current based upon a power setting of the output device.

2. The system as in claim 1 wherein the alarm device further comprises a visual warning device.

3. The system as in claim 2 wherein the visual warning device further comprises a red or flashing warning light.

4. The system as in claim 1 wherein the alarm device further comprises an audible warning device.

5. The system as in claim 1 wherein the capacitor further comprises a supercapacitor.

6. The system as in claim 1 wherein the circuitry further comprises a processor that samples the capacitor voltage to calculate the instantaneous PWM control duty cycle that needs to be sent to the buck converter.

7. The system as in claim 6 further comprising a first program executing on the processor that calculates a ramp rate to achieve a progressive target voltage that is required, just before a next pulse duration period of the output device starts.

8. The system as in claim 7 wherein the processor runs a second program that calculates the instantaneous PWM control duty cycle of the buck converter for each power setting level or pulse duration period of which the output device can be set to.

9. The system as in claim 7 further comprising a third program executing on the processor that gradually reduces and controls both the instantaneous PWM control duty cycle and the next pulse duration period of the output device if an input loop voltage falls below a minimum voltage level consistent with a fault free system.

10. A system comprising:
an analogue addressable alarm system;
a panel of the analogue addressable alarm system;
a 2-wire loop with opposing ends of each wire of the 2-wire loop connected to the panel; and
an alarm device coupled across the 2 wires of the 2-wire loop, the alarm device further comprising:
a switch mode buck converter;
a capacitor that is charged by the buck converter;
a boost converter that powers an output device primarily from energy drawn from the capacitor; and
circuitry coupled to the buck converter and boost converter,
wherein the buck converter charges the capacitor with a relatively constant current and wherein the circuitry dynamically adjusts an instantaneous PWM control duty cycle of the buck converter to provide the constant current based upon a power setting of the output device.

11. The system as in claim 10 wherein the alarm device further comprises a strobe light that provides visual warning of a fire.

12. The system as in claim 11 wherein the output device further comprising a plurality of output devices that are all activated simultaneously for a predetermined time period in a repetitive sequence.

13. The system as in claim 12 wherein the output device further comprises a plurality of diodes connected in series.

14. The system as in claim 12 wherein the power setting of the output device further comprises the predetermined time period of activation of the output device.

15. The system as in claim 14 wherein the circuitry further comprises a processor that determines a voltage drop of the capacitor caused by the predetermined time of activation of the output device.

16. The system as in claim 14 wherein the circuitry further comprises a processor that samples the capacitor voltage to calculate the instantaneous PWM control duty cycle that needs to be sent to the buck converter.

17. The system as in claim 16 further comprising a first program executing on the processor that calculates a ramp rate to achieve a progressive target voltage that is required, just before a next pulse duration period of the output device starts.

18. The system as in claim 17 wherein the processor runs a second program that calculates the instantaneous PWM control duty cycle of the buck converter for each power setting level or pulse duration period of which the output device can be set to.

19. The system as in claim 17 further comprising a third program executing on the processor that gradually reduces and controls both the instantaneous PWM control duty cycle and the next pulse duration period of the output device if an input loop voltage falls below a minimum voltage level consistent with a fault free system.

20. A system comprising:
an analogue addressable alarm system;
a panel of the analogue addressable alarm system;
a 2-wire loop with opposing ends of each wire of the 2-wire loop connected to the panel; and
a plurality of alarm devices coupled across the 2 wires of the 2-wire loop, the alarm devices each further comprising:
a switch mode buck converter;
a capacitor that is charged by the buck converter;
a boost converter that powers an output strobe light primarily from energy drawn from the capacitor; and
circuitry coupled to the buck converter and boost converter, wherein the buck converter charges the capacitor with a relatively constant current and wherein the circuitry dynamically adjusts an instantaneous duty cycle of the buck converter to provide the constant current based upon a power setting of the strobe light.

* * * * *